INVENTORS
Jacob Rabinow
Sidney Greenwald
BY Joseph A. Genovese
ATTORNEY

INVENTORS
Jacob Rabinow
Sidney Greenwald

BY Joseph A. Genovese
ATTORNEY

MULTI-FONT READING MACHINES

Filed Nov. 4, 1966 3 Sheets-Sheet 3

INVENTORS
Jacob Rabinow
Sidney Greenwald
BY Joseph A. Genovese
ATTORNEY

United States Patent Office 3,560,927
Patented Feb. 2, 1971

3,560,927

MULTI-FONT READING MACHINES

Jacob Rabinow, Bethesda, and Sidney Greenwald, Hyattsville, Md., assignors to Control Data Corporation, Rockville, Md.

Filed Nov. 4, 1966, Ser. No. 592,194
Int. Cl. G06k *9/10*
U.S. Cl. 340—146.3 5 Claims

ABSTRACT OF THE DISCLOSURE

An optical character reading machine capable of reading numerous fonts by having electronic character criteria arranged in first and second sets where the first set has representations of various shapes of the top portions of a character and the second set has representations of various shapes of the bottom portion of the character. The numerous possible permutations of shapes yields valid criteria for many fonts of the same character. The machine scans a printed character and the scanner-extracted signals are formed in first and second groups for comparison to the first and second sets of criteria. Resulting first and second correlation signals are combined and examined for the optimal signal from each set. The best of the resulting first signals and the best second correlation signals are combined, examined and a character-identity decision is based thereon.

This invention relates to optical character reading machines and particularly to the class of machine designed to recognize characters of more than one font.

The majority of commercially-available reading machines are single font devices, i.e., they are capable of identifying characters of one font. A few manufacturers offer multi-font reading machines which are capable of identifying characters intermixed from two or a few fonts. Options are sometimes offered by which a machine can be programmed to read any single one of several fonts. Font limitations such as these are quite oppressive. Obviously, single-font machines require the user to print characters in the particular font. Available multi-font machines present the same difficulties but in a lesser degree because they can read only a few different fonts.

Manifestly, a highly desirable reading machine would be one which can identify intermixed characters of any font. The user could then originate his documents in any font by using any printing equipment. At the present time it is not economically feasible for many potential users of reading machines to replace numerous typewriters and printers with other printing devices merely to provide the necessary font-uniformity to satisfy the requirements of existing reading machines. In other cases it is not a matter of feasibility but one of impossibility. For example, it is presently not possible (to our knowledge) for the U.S. Post Office Department to require that mailers use a single or one of a few fonts for printing postal addresses. Yet, reading Zip Codes and/or complete postal addresses is a desirable aid for automatic sorting of mail.

Considerable effort has been expended toward designing a reading machine which is insensitive to or highly insensitive to variations in font. One approach has been to devlop a basic reading technique which is inherently insensitive to font variations. Machines for identifying unconstrained handwritten characters generally rely on such philosophical approaches. The majority of such machines use a curve tracing and/or analysis process to identify the characters. A distinctly different approach to the problem is the more or less brute force effort in an area correlation machine by which a character criterion is built into the machine for each character of the two or more fonts for which the machine is designed. There have been other efforts such as "self-learning" techniques, but the latter efforts have not, at least as yet, been as successful as the analysis and the multi-criterion systems.

While the curve tracing and/or analysis techniques and the muti-criterion system have met with a measure of success, they have inherent deficiencies which are known in the art. Since our invention is more easily compared to the multi-criterion approach than to curve tracing, a few of the deficiencies and limitations of the multi-criterion approach are mentioned below.

While it is theoretically possible to have for each character a single character standard or criterion (generally an electronic mask made of a resistor adder or the functional equivalent), the number of necessary criteria for reading techniques are considered, the multi-criterion ap- To simplify the arithmetic, assume that one is dealing with numerals only as is the case in accounting, reading Zip Codes, etc. If a designer is faced with the problem of constructing a machine to identify the ten numerals of 80 fonts, 800 character criteria (electronic masks) will be required. This number is entirely too large from many standpoints. The initial cost, the space required, the power consumption, etc. are too large. Furthermore, the reading reliability grows smaller as a function of the increase in number of criteria. For example, it is obviously easier for a machine to recognize a scanned character when it is known beforehand that the character is one of a possible ten, than it is to identify the same character when it may be any one of 800 possible characters.

Notwithstanding the above difficulties, when all of the factors pertaining to and surrounding the known basic reading techniques are considered, the multi-criterion approach to the multi-font reading problem appears to be the most attractive. One of the most serious drawbacks in such a system is the requirement for such a large number of electronic masks, their drivers, etc. In our invention we provide a technique by which the benefits of the multi-criterion approach are obtained without the physical requirement for separate, discrete electronic masks for each character. This is accomplished in the following way.

We have two sets of mask sections. Each set has sections corresponding to a portion of each of all of the possible characters. For convenience of description, let us assume that the sections of the first set correspond to the top portions ("half") of the characters, and the second set corresponds to the bottom portions ("half") of the characters. Obviously, the characters could be split from right to left instead of top and bottom, and also, the term "half" need not be accurate. Note, however, that each mask section is approximately one-half the size of an ordinary mask for a full character. By taking advantage of the inter-character similarities, we are able to achieve a great economy of masks by logical combinations of sections as explained in the example give below.

Considering numerals only in the interest of simplicity, we examined a large number of fonts, where we consider the term "font" to mean not only a distinct character style as being one font, but also a difference in size, though the style be identical, to be another font. We determined that we could design electronic mask sections for the top portions of several "1's" and design a few electronic mask sections for several variations of the bottom portions of the "1's." Then by logically combining signals obtained from the top portion mask sections for the "1," and doing the same thing with the signals from the mask sections for the bottom portions, it was possible to have combinations of the few top and bottom portion mask sections function as total masks which would suffice for a large number of fonts for the character "1." The same procedure was followed for the "2," "3" . . . "9," "0." Accordingly, the two sets of electronic mask sections corresponding to the respective tops and bottoms of the characters for ten numerals are capable of being combined in an enormous number of permutations in a rather simple manner. The "combination" of electronic mask sections for the top and bottom portions of the characters is accomplished by logical gating internally of the machine as will be described later. In order to provide an idea of the capability of our invention, the following results were obtained by a machine using our system. The machine contains approximately 90 mask sections in the two sets. As described before, each mask section forms a "half"-criterion, i.e., corresponds to either a top or bottom of one of the ten possible numerals 0–9. While the mask sections were originally designed to accommodate a smaller number of font-variant characters, our machine has read the characters of approximately 85 different fonts. This means that our particular usage of the 90 "half"-criteria has provided a character recognition capability covering 850 different printed variations of the numerals 0–9 inclusive.

One of the secondary reasons that the machine using our present invention is capable of identifying characters of such a large number of fonts, is that character size variation is not nearly so critical in our machine as in other basically area-correlation machines. For example, consider the "1." If the electronic mask representing the character "1" is composed of two "half" criteria, one representing the upper portion of the "1" and the other representing the lower portion of the "1," the vertical dimension of the printed character can vary considerably and still satisfy the mask-combination for the character "1." The distinction becomes more evident if one considers the construction of a typical electronic mask for the numeral "1" using prior techniques where a single mask is used for the full character, e.g., as in U.S. Pat. No. 3,104,369. In area correlation machines of that type, it is required that the scanned character fit almost exactly within the prescription of the electronic mask. However, by dividing the mask, as in our invention, the vertical dimension of each character portion is not critical because the only thing necessary is for the upper part of the character to satisfy the "upper" mask section and the lower part satisfy the "lower mask section. In the "1" example it may be that only 30% of the top "half" of the character will fully satisfy the "upper" mask section, and 30% of the height of the printed character will fully satisfy the "lower" mask section. This will result in a correlation of 100%, and the same benefit and result cannot be obtained in the usual, single-mask configuration such as disclosed in Pat. No. 3,104,369. In other words, the mask in Pat. No. 3,104,369 "seeks" a "1" of an exact height, while our mask sections for the "1" do not. Our "1" mask sections will correlate perfectly with a range of "1's" which vary in vertical dimension only.

From the foregoing, it is apparent that we treat the top portion and the bottom portion of a character separately, and logically combine top and bottom portions criteria or mask sections to achieve an economy in the number of ultimate masks. This is accomplished by the various permutations and possible combinations of mask sections. There are other advantages derived from treating tops and bottoms of characters separately. For instance, attention is directed to U.S. Pat. No. 3,104,369 and particularly to the way that the comparator trigger signal is provided. Data describing the full, scanned character is loaded into the register, and the data is shifted downward until "black" (a character bit) becomes stored in the lowermost row of the register. When this happens it is presumed that the "character" (the data describing it) is normalized (in a known location) in the register. At that instant the decision function is triggered.

Several machines were built as above. All had difficulty in providing the trigger signal even though certain of the safeguards described in the above patent were used. Stray bits in the register, usually originating from ill-defined character edges, light print, dirt, etc., caused trigger signals at improper times.

By treating the top and bottom portions of a single character separately, we can use the upper and lower edges of the portions to serve a purpose analogous to the above. As described later we can set logical rules such as the detection of "white" followed by "black" in rows of the register as prerequisites for several machine control functions, each of which is accomplished with more reliability than the simple character bottoming in a register as in the above patent.

An object of our invention is to provide a multi-font character reading machine which overcomes or is not subject to the above limitations and difficulties with respect to prior electronic mask, area correlation reading machines.

Another object of the invention is to provide a reading machine having a capability of recognizing an unusually wide variety of fonts of characters by constructing the character criteria in sections or portions and relying upon logical combinations and permutations of the sections to perform the functions of electronic masks.

A further object of the invention is to provide a reading machine which is basically of the area correlation type, possessing the inherent advantages of that class of machine, but which does not experience certain of the drawbacks in expanding the capability of the machine to more than one font of print.

Another object of the invention is to provide a multi-font reading machine of the electronic mask, area correlation type wherein the electronic masks are designed in sections corresponding fractions of the characters of different styles and sizes, and the ultimate mask configurations are established by permutations and combinations of the mask sections with the result that a comparatively small number of mask sections can be logically (electronically) combined and arranged to function as total or ultimate masks representing a very much larger number of possible characters than the number of mask sections which are used.

Other objects and features of importance will become apparent in following the description of the illustrated form of the invention which is given by way of example only.

FIGS. 3*a*–3*e* are diagrammatic views showing the information pertaining to the character "4" in various stages of movement through the register.

Figures 3, 4:
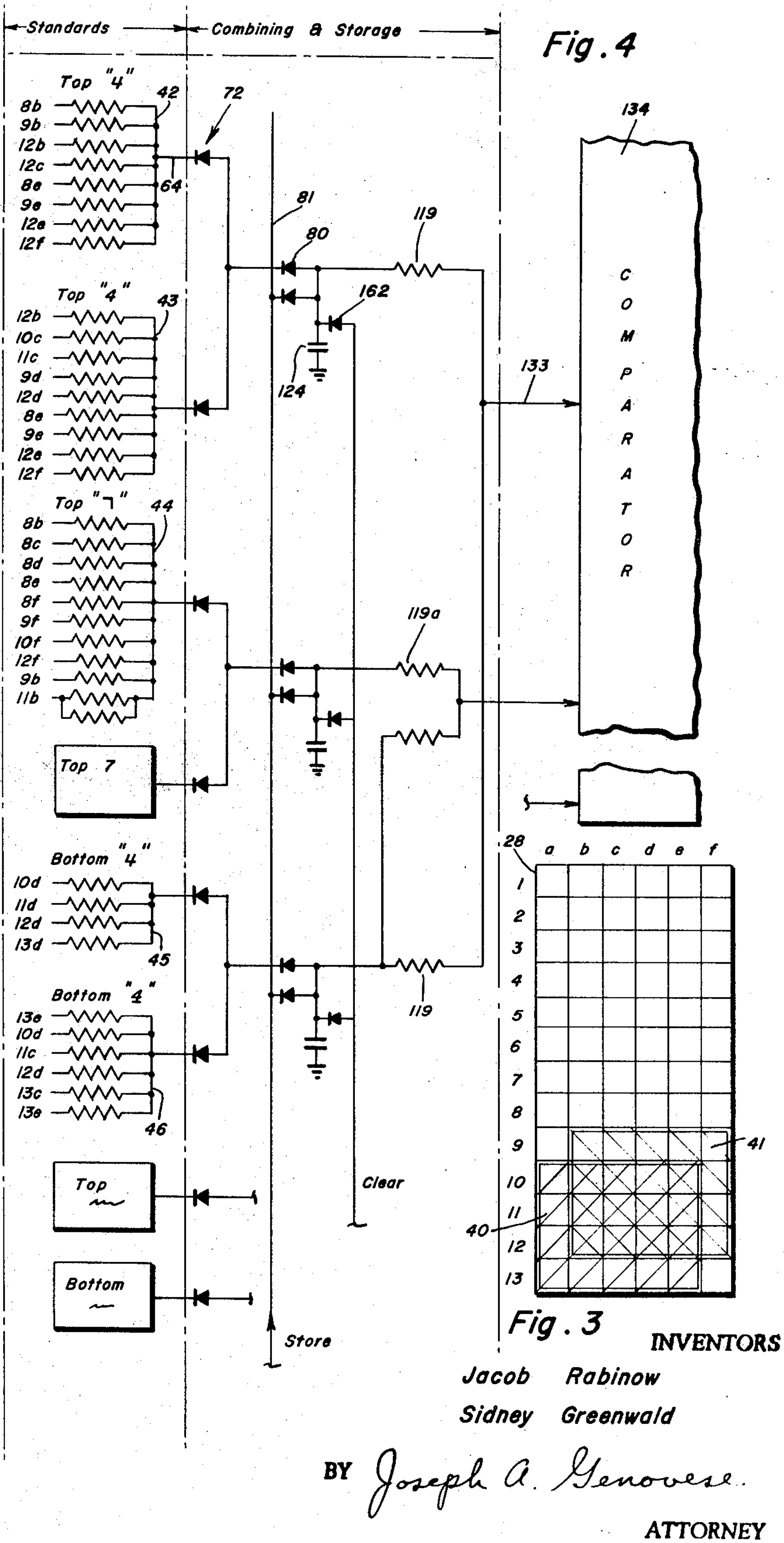

FIG. 4 is a fragmentary view showing the construction of several character standards together with fragments of the combining and storage circuits used in the reading machine.

Figure 1:
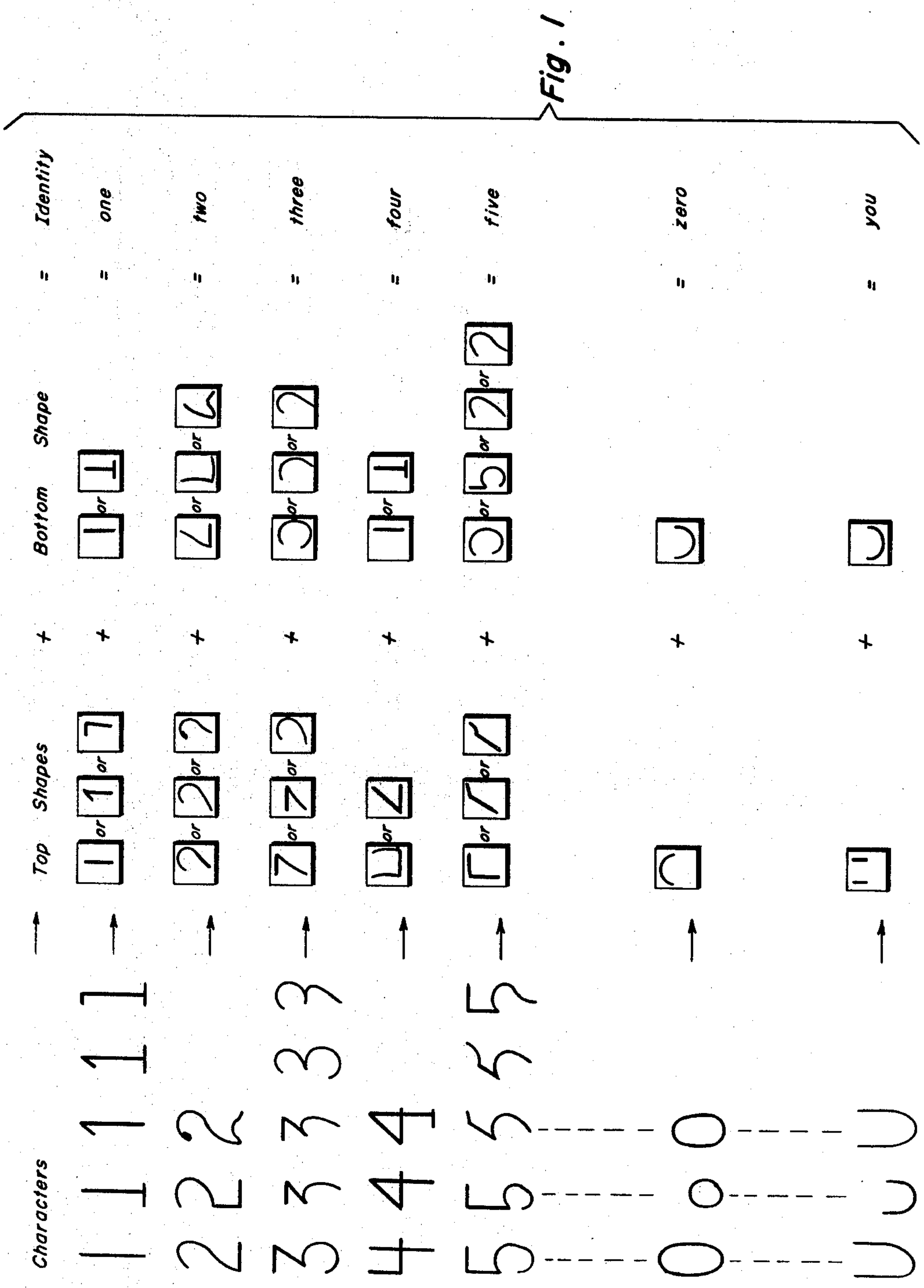
FIG. 1 is a graphic representation of typical printed characters and suggested electronic mask sections for making up complete masks for the characters.

FIG. 1 shows a plurality of characters of different fonts. These characters were selected at random to exemplify different styles and/or sizes representing font distinctions. To the right of the characters there are two columns entitled "Top Shape" and "Bottom Shape." The "shapes" enclosed in the small squares on the drawing schematically represent electronic mask sections. Signals emitted from the mask sections are logically handled as indicated to yield character identity signals. More specifically, in the upper row of FIG. 1 there are five printed characters, i.e., five font variations of the numeral "1." Our invention utilizes only three mask sections representing the top portions of the five printed characters and two electronic mask sections representing all of the bottom portions of the five printed characters. It will be noted that the top sections of the five characters "1" can be represented in only three upper mask sections, while the lower portions of the five printed characters can be represented by only two lower mask sections. Application of logic to the mask sections is indicated directly on FIG. 1. In the second column, a signal indicating correlation with either the first or the second or the third mask section, plus a signal representing correlation with either the first or the second mask section in the second column will yield the identity for the character "1." Note that the mask sections for the "1" identity will be identical if all of the five characters shown at the top left of FIG. 1 were increased 30%, 40%, 50%, etc., in height. With the above explanation, the remainder of FIG. 1 is readily understandable. However, attention is called to the printed character "0." Note that only two mask sections are required for the three printed examples of the character "0." Here again note that the same pair of mask sections for the "0" will apply to numerous additional printed "0's" (not shown) which are larger than the smallest printed "0" in FIG. 1.

While we discuss electronic masks, FIG. 1 suggests that the principles of our invention are applicable to optical mask character reading machines. However, at the present state of the art, the electronic mask machine is far more satisfactory for multi-font reading. One compelling reason for this is the light attenuation experienced when separating an image many times as is required in optical mask reading machines of reasonable speed. Also, we mentioned before that we are discussing electronic mask sections for the top and bottom portions of characters. The mask sections can just as easily be split left and right and/or in more than two sections left and right and/or top and bottom.

Figure 2:
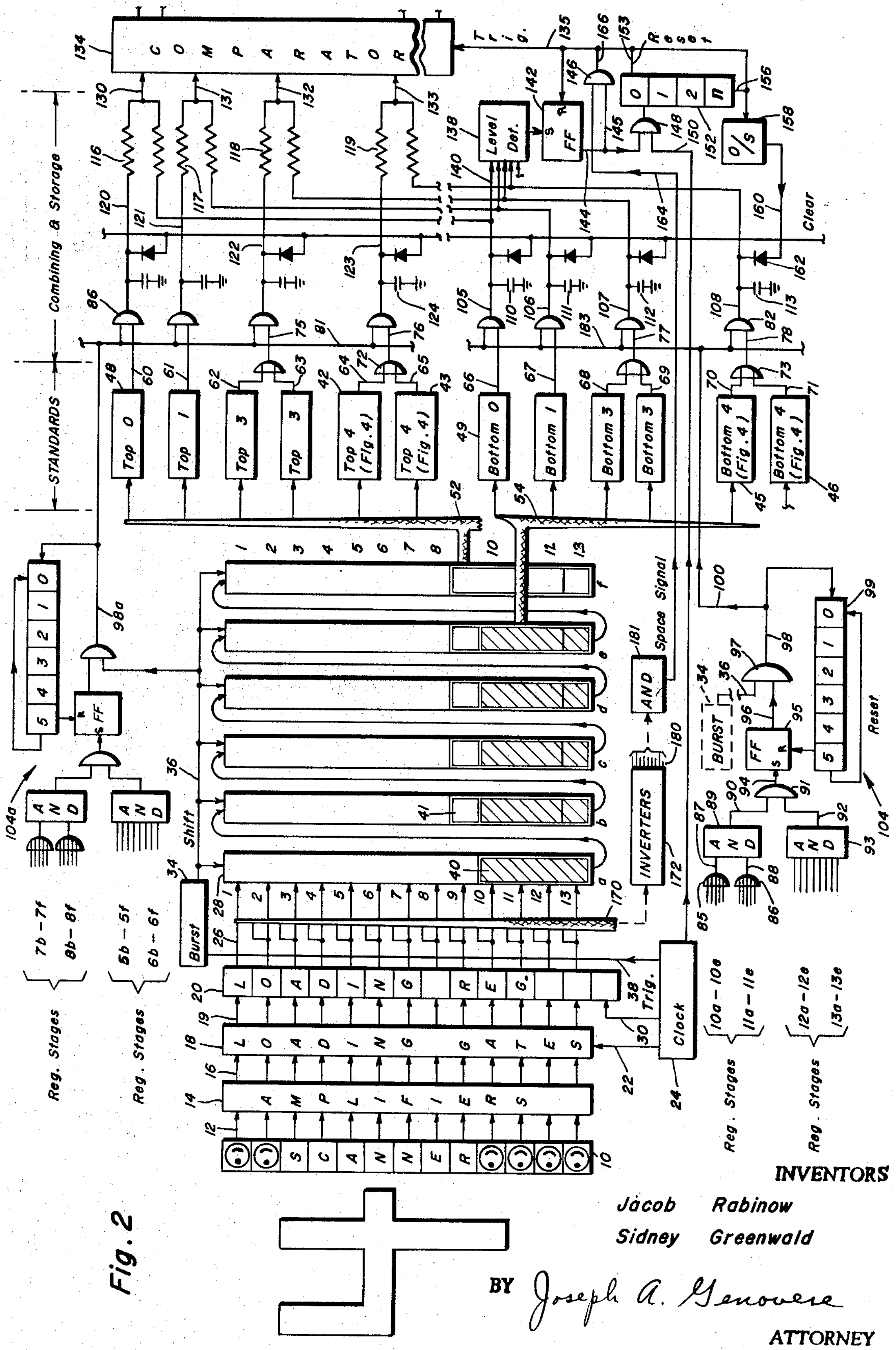
FIG. 2 is a diagrammatic view of the electronic portion of a reading machine constructed in accordance with the invention.

Attention is now directed to FIG. 2 showing a reading machine of the electronic mask, area correlation type which is the same basic type of machine disclosed in U.S. Pat. No. 3,104,369. Many of the subassemblies shown in FIG. 2 can be similar to those shown in the prior patent. With this in mind, we have shown scanner 10 as a column of photocells across which the image of a printed character is horizontally swept by mechanical and optical systems (not shown) of any type. The signals extracted by the scanner photocells from the character area are conducted on lines 12 to the photocell amplifiers 14. The amplifiers can be quantizing amplifiers, or separate quantizers can be used, so that the signals on lines 16 from the amplifiers are digital to represent "black" and "white" sub-areas of the character and its background. Signals on line 16 are applied to loading register 20 by way of loading gates 18 and a group of lines 19. The loading gates are interrogated by clock signals on line 22 which is attached to clock 24 synchronized with the motion of the image of the character. Loading register 20 has its information shifted over lines 26 into the first column, i.e., column *"a,"* of shift register 28 in response to shift signals conducted from clock 24 on line 30.

Register 28 is made of six columns *a, b, c, d, e* and *f* and thirteen rows designated 1–13. A schematic representation of the shift register 28 is shown in FIG. 3 and will be referred to later. As shown in FIG 2, the shift register is loaded in parallel into column *a*, but it shifts serially from the bottom of one column into the top of the next adjacent column in response to a burst of shift signals conducted from burst generator 34 over lines 36. The shift signals are impressed on each column of the shift register. Burst generator 34 is triggered by a signal on line 38 from the clock 24. It is obvious that the timing of the subassemblies described so far must be adjusted or controlled properly as is known to the designer and as is common in the art. The timing must be such that this portion of the reading machine operates as follows:

As the image of the character horizontally moves over the photocells of scanner 10, the amplified signals extracted from the character area are conducted to the loading gates and these are interrogated for "black" and "white" representing signals. Such signals are loaded into register 20 in response to a signal on line 22 which is impressed on all of the loading gates simultaneously. After the loading register is stored, the shift signal on line 30 steps the information from the register 20 into column *"a"* of register 28. A burst of pulses on lines 36 triggered by a signal on line 38 shifts the information a predetermined number of steps in the register. As illustrated, the number of steps will be 13 because there are 13 vertical stages in each column of register 28. It is understood, of course, that the illustrated resolution is small, i.e., 13 by 6, and that higher resolution is recommended for the more powerful reading machines.

After the "first" scan, the second scan follows. Each "scan" is defined as an examining cycle by scanner 10 and a loading cycle into column *"a"* of the shift register 28.

Figures 3A, 3B, 3C, 3D, 3E:
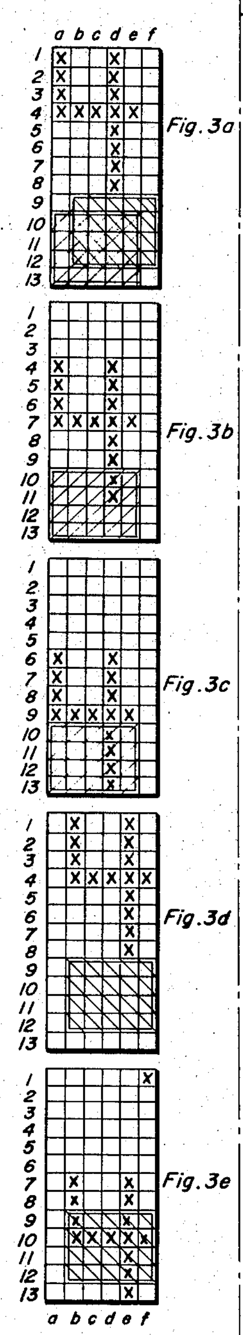
FIG. 3 is a schematic view of a conventional shift register arranged as a grid with $x$–$y$ coordinates designated to facilitate the description of the invention.

Loading and shifting in register 28 continues as the character is swept across the photocells of scanner 10. Eventually, during the examination of the character ("4" in FIG. 2) the entire representation of the character will be stored in the register as schematically shown in FIG. 3*a*. FIGS. 3*a*–3*c* show the stored information being stepped through the register. FIG. 3*d* shows the condition of the register during a subsequent scan, i.e., the scan of the clear white space to the left of the character "4" in FIG. 2. FIG. 3*e* shows the condition of the register when the information as stored in FIG. 3*d* has been shifted vertically downward six steps (of the burst of thirteen in our illustration).

For purpose of simplicity of discussion, it is assumed that the shift register 28 is constructed somewhat like the shift register in U.S. Pat. No. 3,104,369, except that we have full-serial shifting. In the referenced patent each shift register stage provides two output signals which are the complements of each other, e.g., +6 and −6 volts depending upon the state of the shift register stage, i.e., representing "black" or representing "white." Thus, assertain signals and negation signals (as defined in the previously mentioned patent) are available at each stage of the shift register. The electronic masks in the referenced patent are rigidly wire to preselected conductors of the shift register stages, and in our present invention we connect our mask sections to predetermined assertain and negation conductors of selected stages of the register. Since the scanner-extracted data pertaining to the character is serially shifted into the register 28 from the left to the right, we can decide that we will detect a specific portion of the character before the other as follows: By connecting the electronic mask sections pertaining to the bottoms of all possible characters one (or more) columns to the left of the connections for the electronic mask sections pertaining to the tops of the characters, as the data from the scanner shifts through the register it must be exposed to the mask sections for the bottoms of the characters before the mask sections for the tops of the characters. Thus, area 40 of the register (FIG. 3) which is hatched with lines running down and to the left, forms the connection points for the mask sections corresponding to the bottoms of the characters. The area 41 of register 28 which is hatched with lines slanting down and to the right is of a size similar to section 40 (although this is not necessary) and is displaced to the right and upward one (or more) column and row respectively from area 40.

Attention is directed to the top part of FIG. 4 showing how two top section masks for the character "4" are physically constructed. We have illustrated two resistor adders 42 and 43 whose inputs (connections with assertion terminals of register 28 in FIG. 3) are as designated. Immediately below the electronic mask sections 42 and 43 there is an electronic mask section 44 designed for the top portion of a character "7." The resistor adder forming mask section 44 utilizes two negation connections, one of which is weighted electrically just as in the referenced patent. This, in the description of our present invention, is merely to show that we can use negation and weighting techniques. Below mask section 44 are mask sections 45 and 46 designed for two different styles of bottom sections of the character "4." It is understood that the resistor connection designations are keyed to the coordinate positions indicated on register 28 in FIG. 3 and FIG. 2.

Other mask sections disclosed in FIG. 2 are indicated generally at 48 for the top portions of characters in FIG. 2, and at 49 for the bottom portions of the characters. Those mask sections which are shown in detail in FIG. 2 and which are indicated at 42, 43, 45 and 46 are similarly designated in FIG. 3. The necessary wiring for connecting the resistors of the electronic mask sections to the shift register areas 40 and 41 is contained within cables 52 and 54.

The preceding description covers the scanning of a character "3." The OR gates 72 and 73 (and all those register, the processing of the data in the register, the construction of the electronic mask sections and their connections with the specific areas 40 and 41 of the shift register. It is understood that the electronic mask sections provide correlation signals which correspond to the degree of match between the portions of an examined character and the various mask sections. As illustrated in FIG. 2, lines 60–65 will conduct correlation signals for the degree of match between the top of the examined character and the mask sections for the top of the characters "0," "1," "3," "3" (another style), etc. Lines 66, 67, 68, 69, 70 and 71 conduct correlation signals of a value corresponding to the correlation between the examined lower part of the character and the bottom electronic mask sections. Where two separate electronic mask sections are used for two different shapes, styles or sizes of the tops (or bottoms) of the same character, the respective correlation signals are OR gated. For example, in FIG. 2 the lines 64 and 65 from inputs to the OR gate 72, because line 64 and 65 are the output lines from the electronic mask sections pertaining to two different styles of top portions of the character "4." The electronic mask sections 45 and 46 have their output lines 70 and 71 OR gated at 73 because the mask sections 45 and 46 correspond to two different styles of the lower portions of the character "4." In a like manner we have illustrated OR gates for top section masks for the character "3" and the same holds true for the bottom section masks for the character "3." The OR gates 72 and 73 (and all those like it) will pass the "better," e.g., most negative or more positive, of the signals impressed thereon. Thus, the output lines 75, 76, 77 and 78 of the four OR gates given by ways of example in FIG. 2, will each conduct a signal reflecting the best match between the pairs of OR-connected electronic mask sections with which they are associated. The lines 60, 61, 75 and 76 form single inputs to a set of AND gates 80, and lines 66, 67, 77 and 78 form inputs to AND gates 82. The AND gates 80 and 82 will not let signals pass until such time as the other input to each is satisfied. An upper buss 81 is connected to all of the AND gates 80 (for the top electronic mask sections) and a lower buss 83 is connected to AND gates 82 (for the bottom electronic masks). The signals conducted on busses 81 and 83 are control signals which are provided when certain sets of conditions exist within the shift register 28. Specifically, when the character data describing a scanned character stored in register 28 becomes located in the position shown at FIG. 3*b*, and lower AND gates 82 are enabled to pass the signals on their lines 66, 67, 77 and 78. When the information pertaining to the scanned character is in the position shown in FIG. 3*e*, gate enable signals for gates 80 are conducted on buss 81 allowing the signals on lines 60, 61, 75 and 76 to pass gates 80. This is accomplished by the logic circuit networks 104 and **104*a*** shown at the lower part and at the upper part of FIG. 2 which are constructed and operates as follows:

Consider first the logic circuit network 104 at the bottom of FIG. 2. There are two OR gates 85 and 86 having as inputs, lines connected to stages **10*a*–10*e* and 11*a*–11*e* respectively of shift register 28. Thus, if any of these stages which form two horizontal rows of area 40 in register 28 contain information pertaining to "black" in any stage, the output lines 87 and 88 of OR gates 85 and 86 conduct a signal to AND gate 89. Accordingly, the logical requirement is that there be at least one bit (representing "black") stored in one of stages 10*a*–10*e* and another bit stored in one of the stages 11*a*–11*e* before a signal is passed by AND gate 89 to be conducted over line 90 to AND gate 91. This forms one input of AND gate 91, the other being on line 92 which is the output line of AND gate 93. The inputs for AND gate 93 are taken from rows 12*a*–12*e* and 13*a*–13*e* of shift register 28, however, they are the negation signals ("not-black") of these stages. Thus, the second logical requirement is that there be no character-bit stored in either of the horizontal rows 12*a*–12*e* and 13*a*–13*e* in order to provide the required input to AND gate 91**. When these logical conditions are fulfilled (e.g., as in FIG. 3*b*), AND gate 91 will provide a signal on line 94 to set flip-flop 95 thereby remembering this condition. The output line 96 of the flip-flop forms one input of AND gate 97, the other being on line 36. As described before, line 36 is the conductor of the pulses from burst generator 34 (used to shift the information in register 28 serially therethrough).

The pulses on output line 98 of AND gate 97 step a five stage ring counter 99. The signal from the fifth stage of the ring counter is used to reset the flip-flop 95. Line 100 is attached to line 98 to conduct the five pulse signals to buss 83 for the purpose of interrogating gates 82 as described before. It is mentioned that five pulses pass over line 100 and this is so because ring counter 99 has been selected (arbitrarily) to have five stages, and when it is stepped to the fifth stage, the flip-flop 95 becomes reset thereby removing the gate-enable signal from line 96. Thus, only five (of the 13) pulses generated by burst generator 34 pass gate 97.

The logic circuit network **104*a* at the top of FIG. 2 is identical to the logic circuit network 104. However, the connections with the shift register stages are different, the difference specifying different logical conditions from those required of the logic circuit network 104. For interrogation pulses to be conducted on line 98*a*, there must be "black"—representing signals (a bit representing a portion of the character) stored in at least one of the stages of horizontal row 7*b*–7*f* and horizontal row 8*b*–8*f* of the shift register. In addition, there must be "white"—representing signals stored in all stages of both horizontal rows consisting of stages 5*b*–5*f* and 6*b*–6*f*** (e.g., as in FIG. 3*e*) before the pulses which interrogate gates 80 will be conducted on buss 81.

Since the stages associated with logic network 104 are in area 40 of the shift register (area 40 being displaced to the left of area 41 in register 28) and since the shift register is loaded from the left, the logic network 104 which provides gate-interrogation pulses on line 83, will function before the upper logic network **104*a* which provides gate-interrogation pulses on line 81**.

When the gates 82 are interrogated, the signals passed by the gates 82 are conducted on their respective output lines 105, 106, 107 and 108, and these are the correlation signals yielded by the lower mask sections (mask sections for the lower portions of the characters) as logically combined, e.g., by OR gate 73. Charges corresponding to the correlation signals are stored on capacitors 110, 111, 112 and 113 which are attached to the lines 105, 106,

107 and 108. As shown to the upper right part of FIG. 2, the last mentioned lines terminate in resistors of resistor adders 116, 117, 118 and 119.

Just after the sampling of gates 82 commences, the stored data pertaining to the scanned character will be shifted further in register 28 to a position at which the logical requirements of network 104*a* are satisfied, e.g., as in FIG. 3*e* where "white" signals are stored in rows 5 and 6 and "black" signals are stored in one stage (at least) of each row 7 and 8. Thus, the logic network 104*a* will cause interrogation signals to be passed on line 98*a* and buss 81 to allow the correlation signals from the top mask sections to pass gates 80 and be conducted over lines 120, 121, 122 and 123 which terminate in resistors of the adders 116, 117, 118 and 119. Capacitors 124 for the respective lines 120 . . . 123 store charges proportional to the values of the correlation signals. Where signals from the lower or bottom electronic mask sections are logically combined, as masks 42 and 44 with OR gate 72, the OR gate will pass the better of the two correlation signals.

The resistor adders 116 . . . 119 combine the stored correlation signals of the top mask sections with the stored signals from the bottom masks to provide match signals on lines 130, 131, 132 and 133. However, the match signals are ineffectual until the comparator 134 is triggered by a signal on line 135. Comparator 134 can be a gated or triggered comparator such as described in U.S. Pat. No. 3,104,369.

There are alternate ways (illustrated) for triggering comparator 134. These methods of triggering can be used individually or as supplementary to each other as shown. More particularly, level detector 138 is attached by lines 140 to the respective correlation signal lines 105, 106, 107 and 108 of the bottom mask sections. When a predetermined threshold is reached on any one of the lines 140, the level detector (e.g., a one shot multivibrator with a threshold) is fired to set flip-flop 142 whose output line 144 conducts standing signals to two AND gates 146 and 148. The AND gate 148 has a clock signal line 150 attached to it as its other input, and the output of the gate 148 steps counter 152 one stage per signal from clock 24. (Clock 24 ascertains the time at which the character is vertically scanned, e.g., sliced.) Thus, after "*n*" clock signals or scans counter 152 steps to its end to emit a signal on line 156 which is attached to the trigger signal line 135 and to a one shot multivibrator 158. The one shot multivibrator provides an output on line 160 which is coupled with diodes 162 to the lines 105 . . . 108 and 120 . . . 123 to clear the capacitors 110 . . . 113 and 124. It is thus evident that the comparator 134 will be triggered "*n*" scans after the level detector 138 experiences a threshold voltage condition on any of the lines 105 . . . 108. The trigger signal on line 135 is fed back on line 153 to reset counter 152 to its rest position.

As mentioned before, the firing of the level detector sets flip-flop 152 and provides an input, via line 145, to gate 146. If, during the stepping of counter 152, a clear white space between adjacent printed characters is detected, there will be a signal exemplifying this on line 164 which forms an input to gate 146. The output of gate 146 is conducted on line 166 which is attached to line 135 thereby providing it with the necessary signal to trigger comparator 134. A trigger signal yielded in this way will reset counter 152 via line 153 and will also fire the multivibrator 158 to clear the capacitors through diodes 162.

The signal extracted from the clear space between adjacent characters can be obtained in a number of ways known in the art. One is to connect an individual line to each of the conductors 26 between the loading register and column "*a*" of shift register 28. These lines are in cable 170, and each line has an inverter 172 connected with it. The outputs 180 of the inverters form inputs to AND gate 181, and the output line of the AND gate 181 is the aforementioned line 164.

The reading machine constructed in accordance with the invention has been described primarily in connection with FIG. 2. FIG. 4 discloses the character standards (mask sections), the combining and the storage circuits in more detail. The standards 42, 43, etc., shown in FIG. 4 are constructed as indicated. The combining and storage circuits shown in FIG. 2 are indicated by gating, capacitor storage, diodes, and resistor adders. For combining the mask sections 42 and 43 (for two versions of top portions of the numeral "4") OR gate 72 is used. The OR gate can be constructed of diodes as shown in FIG. 4, while the AND gate 80 following OR gate 72 is also constructed of diodes although we could have just as easily used transistor (or other) gates. The combining and storage circuits of FIG. 4 differ from those of FIG. 2 in the following important respects. The resistor adder 119 combines the best correlation signal from the two types of top portion mask sections 42 and 43 of the character "4," with the best signal from one of the two illustrated bottom portions (mask sections 45 and 46) to yield a match signal on line 133. Note however, that the mask section 44 for the top of the numeral "7" has its signal resistively added by adder 119*a* with the best signal from the mask section 45 or 46 pertaining to the bottom portions of the numeral "4." This is the way that we actually constructed our machine, i.e., we took advantage of numerous possible permutations. Such permutations not only involved font variations of the same character, but where it was possible, fractions or sections which had inter character identity or close similarity were used in common with more than one character.

It is understood that changes may be made without departing from the protection of the claims.

We claim:

1. A multi-font character reading machine comprising in combination:

means to scan a character area and to provide a group of signals which correspond to the scanned character area;

a first set of character criteria responsive to a plurality of signals which correspond to first parts of the characters that the machine is expected to identify, each set containing a plurality of said criteria; a second set of character criteria responsive to a plurality of signals different from said first set of signals and which correspond to second parts of the characters that the machine is expected to identify, each set containing a plurality of said criteria; various combinations of first and second parts of criteria defining criteria for identifying complete characters;

means for comparing said group of signals to said first and second sets of criteria to provide correlation signals from said first and second sets of criteria;

means to combine correlation signals from selected predetermined criteria of said first set;

means to combine correlation signals from selected predetermined criteria of said second set;

said combining means providing further correlation signals which correspond to the optimum of the compared signals in each instance;

means to store said further correlation signals and also those correlation signals which are not combined with others; further combining means to combine predetermined stored signals in a manner such that for each character there is at least one stored signal corresponding to a first part of a character and at least one stored signal corresponding to a second part of the character; said further combining means providing match signals;

decision means responsive to said match signals to identify the scanned character;

said comparing means including a register in which said group of signals are stepped;

said first set of criteria being connected with a specific portion of said register ahead of the second set of criteria in the direction of stepping of said group of signals;

first logic means to detect the presence of signals defining a part of the scanned character at said portion of the register and to provide a first storage-enable signal for a duration; said storing means for certain of said correlation signals adapted to be rendered operative by said storage-enable signal; said second set of criteria being connected with a second specific portion of said register;

second logic means to detect the presence of signals defining a part of the scanned character at the last-mentioned portion of the register and to provide a second storage-enable signal for a duration; and said storing means for certain of said correlation signals adapted to be rendered operative by said second storage-enable signal.

2. The subject matter of claim 1 wherein said first set of character criteria include electronic masks which correspond to the lower parts of the characters, certain of said masks corresponding to different shapes or sizes of the lower part of the same character, the last-mentioned masks being those whose correlation signals are combined by said combining means to provide a said further correlation signal.

3. The subject matter of claim 1 wherein said decision means are responsive to a trigger signal, level detecting means responsive to at least certain of said stored signals and adapted to operate upon detection of a stored signal which exceeds a predetermined threshold, and means responsive to the operation of said level detecting means for providing said decision trigger signal.

4. The subject matter of claim 3 wherein said means responsive to the operation of said level detecting means include a delay device.

5. The subject matter of claim 1 wherein said decision means are trigger actuated, level detecting means to examine at least some of said stored signals for a threshold value at which said level detecting provides an output, means responsive to said output to provide a decision trigger signal, the last-mentioned means including a delay device to delay the trigger signal for a duration which is synchronized with the stepping of said register.

References Cited

UNITED STATES PATENTS

| | | | |
|---|---|---|---|
| 3,167,745 | 1/1965 | Bryan et al. | 340—146.3 |
| 3,197,736 | 7/1965 | Leightner et al. | 340—146.3 |
| 3,267,432 | 8/1966 | Bonner | 340—146.3 |

MAYNARD R. WILBUR, Primary Examiner

M. K. WOLENSKY, Assistant Examiner